United States Patent [19]

Khalil et al.

[11] Patent Number: 4,846,277
[45] Date of Patent: Jul. 11, 1989

[54] CONTINUOUS PROCESS OF HYDRAULIC FRACTURING WITH FOAM

[75] Inventors: Carlos N. Khalil, Rio de Janeiro; Zadson de Franco, Aracaju, both of Brazil

[73] Assignee: Petroleo Brasileiro S.A. - Petrobras, Rio de Janeiro, Brazil

[21] Appl. No.: 202,352

[22] Filed: Jun. 6, 1988

[30] Foreign Application Priority Data

Jun. 5, 1987 [BR] Brazil ............................ PI8702856[U]

[51] Int. Cl.$^4$ ........................................ E21B 43/267
[52] U.S. Cl. .................................. 166/280; 166/300; 166/308
[58] Field of Search ............... 166/270, 271, 280, 300, 166/308, 309

[56] References Cited

U.S. PATENT DOCUMENTS

| | | | |
|---|---|---|---|
| Re. 30,935 | 5/1982 | Richardson et al. | 166/309 X |
| 2,889,884 | 6/1959 | Henderson et al. | 166/308 |
| 3,937,283 | 2/1976 | Blaver et al. | 166/308 X |
| 3,980,136 | 9/1976 | Plummer et al. | 166/308 X |
| 4,126,181 | 11/1978 | Black | 166/308 X |
| 4,232,741 | 11/1980 | Richardson et al. | 166/281 |
| 4,330,037 | 5/1982 | Richardson et al. | 166/300 X |
| 4,482,016 | 11/1984 | Richardson | 166/309 X |
| 4,617,997 | 10/1986 | Jennings, Jr. | 166/308 X |
| 4,627,495 | 12/1986 | Harris et al. | 166/308 X |

Primary Examiner—George A. Suchfield
Attorney, Agent, or Firm—Sughrue, Mion, Zinn, Macpeak & Seas

[57] ABSTRACT

A continuous process of hydraulic fracturing of a well with in situ nitrogen foam generation, comprising the steps of:

(a) preparing an aqueous solution of $NH_4Cl$ having a concentration of from 2.0–6.0M;
(b) preparing an aqueous solution of $NaNO_2$ having a concentration of from 6.0–9.0 M;
(c) preparing an aqueous solution of acetic acid having a concentration of about 40% v/v;
(d) adding hydroxyethylcellulose (HEC) to said $NH_4Cl$ solution at a concentration of from 0.3–1.2% w/v to form a viscosified $NH_4Cl$ solution;
(e) simultaneously pumping said viscosified $NH_4Cl$ solution and said $NaNO_2$ solution to form a mixture having a equimolar amounts of $NH_4Cl$ and $NaNO_2$ thereby initiating an equimolar reaction between the components of said mixture;
(f) pumping the acetic acid solution into the equimolar mixture of $NH_4Cl$ solution and $NaNO_2$ solution, so as to initiate foam generation, while keeping the pH of the mixture between 4.75 and 5.50;
(g) injecting a cushion of the generated foam into the well (pre-flash);
(h) initiating the fracturing of the formation by injecting foam to which is added sand as a propping agent, said agent being added to the viscosified $NH_4Cl$ solution, in amounts varying from zero to 0.92 kg/l of the foaming mixture; and
(i) after the fracturing, injecting in the well a cushion of sand-free foam (over-flash) of the same composition as the fracturing foam.

3 Claims, 3 Drawing Sheets

CONTINUOUS PROCESS OF HYDRAULIC FRACTURING WITH FOAM

BACKGROUND OF THE INVENTION

The present invention refers to hydraulic fracturing with foam. More specifically, the present invention refers to hydraulic fracturing with nitrogen foam generated in situ, by means of chemical reaction between aqueous solutions of nitrogen salts.

As it is well-known, nitrogen gas is widely utilized in well-treatment operations, nitrogen being available from cryogenic cylinders. The applicant verified now that it is possible to conduct hydraulic fracturing of formation with nitrogen foam generated in situ, utilizing conventional equipment and pumping and mixing to conduct the treatment, without requiring facilities for liquid nitrogen storage and conventional high-pressure unit, cryogenic pumping and vaporization unit.

BACKGROUND OF THE INVENTION

Formation fracturing in which the fracturing fluid consists of foam is a widely explored technique. Foams contain up to 95% of gaseous phase, the most usual range being 65-85% of gaseous content. Foams offer various advantages as a fracturing fluid: high sand carrying and suspension capacity, low filtrate low, low hydrostatic pressure, low pressure drop by friction, fast fluid recovery, low formation damage, and absence of fracture conductivity reduction due to fluid ingredients. Although most foam applications have been conducted in low-permeability gas reservoirs, oil reservoirs have been successfully subjected to this type of treatment, its operational cost being equal to or slightly lower than that with conventional fluids.

Foams as fracturing fluids are dispersions of gas, usually nitrogen, in a liquid, usually water, with a small proportion of a surfactant foaming agent. The volumetric gas content (referred to as "foam quality") is usually in the range between 65 and 85%. The surfactant represents 0.5-1.0% of liquid volume. The stability is increased by the addition of more surfactant, whether a foaming or a gelling agent. Those foams are homogeneous mixtures with a narrow range of bubble size, average bubble size under 200 microns, being stable during several hours. The scientific and technical literature deals with the various aspects connected to the physicochemical and rheological properties of the foams, and their application in well treatment. On this subject, refer to R. E. Blauer and C. A. Kohlhaas, "Formation Fracturing with Foam", SPE 5003, 1974; D. R. Davies and E. A. Richardson, "Field Application of in situ Nitrogen Gas Generation System", SPE 9653, 1981; S. H. Raza, "Foam in Porous Media: Characteristics and Potential Applications", SPE Journal, December 1970, p. 328-336; W. A. Abbott and H. F. Vaughn, "Foam Frac Completions for Tight Gas Formations", Petroleum Engineer, April 1976, p. 38-50; S. R. Grundmann and D. L. Lord, "Foam Stimulation", Journal of Petroleum Technology, March 1983, p. 597-602; V. L. Ward, "Nitrogen and Carbon Dioxide in the Oil Field: Stimulation and Completion Applications", SPE no. 12594, 1984, and references mentioned in the papers above.

Basically, foam is defined as a coarse dispersion of gas in a liquid, each bubble being encapsulated by a thin liquid film. The foaming agent acts at the system's interface, having preferably the polar portion of the molecule oriented towards the liquid phase and the non-polar portion oriented towards the gaseous phase. The stability of a given foam is basically associated to two factors: the tendency of liquid drainage and the tendency of film breaking as a consequence of randomic disturbances.

One physicochemical characteristic which easily identifies a given foam is the quality. Foam quality ($\Gamma$) is defined as the ratio between the volume of gas in the dispersed phase and the total foam volume:

$$\Gamma = \frac{V_g}{V_t} = \frac{V_g}{V_g + V_l}$$

where the total volume includes the aggregate volume of the gas and liquid which form the foam.

Under given pressure and temperature conditions the compressibility of the foam or, more accurately, of the gaseous phase, can be defined. Such compressibility, on its turn, affects foam quality in case of pressure and/or temperature variation. Boyle's law can be directly applied to a given foam, at a given temperature, neglecting gas solubility and liquid compressibility:

$$\Gamma = \frac{1}{1 + \frac{P}{P_a}\left(\frac{1}{\Gamma_a} - 1\right)}$$

where $\Gamma$ is the foam quality at a given pressure P and $\Gamma_a$ is the foam quality at atmospheric pressure.

The texture of a given foam is associated to gas-bubble size distribution. The smaller the bubbles and the more uniform their distribution, the more viscous shall the foam be.

The rheological properties of a foam are a function of liquid phase viscosity, foam quality and shear rate. According to some hypothetical models, a foam with quality between 0 and 0.54 presents a viscosity value near that of the liquid phase, and its behavior shall be newtonian. Foams with quality range between 0.54 and 0.96 present a viscosity value higher than that of the liquid phase, increasing with quality and decreasing with shear rate, that is, they present a pseudoplastic behavior.

For quality values above 0.96, the system starts being classified as a mist, and the viscosity decreases down to the value of gas viscosity, that is, zero.

Fracturing foams are presently generated by means of simultaneously pumping the aqueous fluid which contains the foaming agent and the inert gas, usually nitrogen obtained from cryogenic cylinders. The dispersion of gas in the liquid phase is achieved by means of a diffuser which receives the components in a turbulent regimen.

In-situ nitrogen generation with the purpose of stimulating the production of formation gas or oil has also been described in patents. U.S. Pat. No. 3,937,283 describes well fracturing with foam generated from liquid nitrogen and surfactant, process parameters being adjusted so that foam quality be in the range of 0.52-0.99. U.S. Pat. No. 4,178,993 describes, on its turn, what is technically referred to as "backsurging", that is, a gas well which cannot produce due to the hydrostatic pressure of the liquid which it contains, starts producing again when an aqueous solution with reagents capable of producing nitrogen gas is injected in the well, the gas generated displacing a sufficient volume of liquid out of the well, so that the hydrostatic pressure becomes lower than the fluid pressure in the adjacent portion of the reservoir and the fluid is displaced from the reservoir towards the well.

U.S. Pat. No. 4,232,741 describes the temporary blocking of parts of an underground reservoir by the injection of an aqueous liquid solution containing gaseous nitrogen generating reagents, a foaming surfactant and a pH-controlling agent which acts towards maintaining the solution less reactive (delayed system) inside the well but forms a relatively immobile foam inside the pores or other reservoir openings. Foaming is achieved within the formation. U.S. Pat. No. 4,219,083 describes another backsurging process with in-situ foam generation, the gas-generating solution containing also an alkaline delaying buffer and a pH-reducing reagent which eventually destroys the buffer effect, so that the fast production of gas and heat promotes backsurging. U.S. Pat. No. 4,330,037 describes the increase in permeability of a formation to oil by the injection of a nitrogen-forming solution, with exothermicity, and an alkaline buffer controlling the reaction rate.

SUMMARY OF THE INVENTION

The present invention, similarly to some references mentioned, is based on the reaction between ammonium ions and nitrite ions of an aqueous solution of these salts, producing nitrogen gas and heat. On the other hand, the distinctive characteristics of the present invention are related to the state-of-the-art refer to the concentration of the reagents, to the fact that the reaction of the present invention is accelerated (whereas the literature mentioned employs reactions usually delayed by alkaline buffers), does not require any foaming agent and foam generated is achieved at the surface, instead of being achieved inside the formation. Other peculiar aspects of the present invention refer to the half-life time of the reaction, which in the present invention is 60 minutes (in U.S. Pat. No. 4,232,741 this parameter can reach 1,000 minutes), and the gas volume/liquid volume ratio is here 72/1, whereas, for instance, in U.S. Pat. No. 4,232,741 such ratio is, at most, 44/1.

Thus, the present invention relates to a process of formation hydraulic fracturing based on the production of nitrogen foam generated by the exothermic reaction of nitrogen salts. The aqueous solution generating gaseous nitrogen contains: (a) a compound bearing at least one nitrogen atom to which is connected at least one hydrogen atom and which can be rapidly and exothermically oxidizes, in an acid aqueous solution, for the production of heat, nitrogen gas and liquid or dissolved by-products substantially inert to well pipe and reservoir components; (b) at least one oxidizing agent capable of oxidizing the nitrogen compound of (a); (c) a buffer system capable of maintaining the pH of the solution nearly equal to or less than 5.0; a viscosifying compound, which may be any water-soluble polymer or gel capable of increasing the effective viscosity of the foam generated.

The compounds (a)-(b) which in an aqueous solution form the oxidation-reduction couple can be constituted, for instance, by urea-sodium hypochloride, ammonium hydroxide-sodium hypochloride, urea-sodium nitrite, ammonium chloride-sodium hypochloride or ammonium chloride-sodium nitrite. The latter was the couple selected for the reaction of nitrogen foam formation of the present invention, due to the easy kinetic control of the reaction, strong exothermicity, sensitivity to the pH of the medium and to the temperature.

The buffer system c) consists of an aqueous solution of acetic acid at 40% v/v and the viscosifying compound is, preferably, hydroxyethylcellulose (HEC). One of the advantageous aspects of the present invention is that, in opposition to what is usually practiced, the applicant employs, instead of surfactant, the viscosifying compound HEC. That is so because the surfactant employed can cause, in contact with the formation: (a) a change in rock wettability; (b) oil emulsification; (c) precipitation due to the incompatibility with formation water. On the other hand the viscosifying compound (HEC) promotes higher foam viscosity with lower concentration than the surfactant.

The water utilized for dissolving the nitrogen reagents is any good-quality industrial water, free from contaminants such as mineral acid, alcohol, alkalies, dichromates and salts of trivalent iron. The solution of sodium nitrite must be free from strong acid to prevent the generation of nitrous acid, which breaks down to nitrous oxide, a compound which has an irritating smell. The solution of ammonium chloride must be free from alkaline substances to prevent the release of ammonia.

The reaction between the nitrogen-generating compounds comprises the steps of reagent dissolution, formation of the $NH_4^+NO_2^-$ complex and further dissolution of the complex into nitrogen and water. The decomposition reaction may be subject to variation in its rate, in case the acid hydrogen species ($H^+$) is introduced in the medium. Thus, the equation which describes the rate of the reaction depends upon the concentration of ammonium, nitrite and acid hydrogen ions. Other influencing parameters, as temperature, agitation and viscosity, are associated to the degree of proximity of the chemical species nitrite and ammonium in the formation of the complex. Pressure, temperature and solubility, on the other hand, shall rule the state of the gas (PVT) produced. It should be pointed out that the removal of the reaction product from the reactional medium favors the reaction towards the products.

On the other hand, the nitrogen-generating reaction indicates a 1:1 stoichiometry (equimolar) between ammonium chloride and sodium nitrite. It may be verified that, maintaining the equimolar proportion between the reagents and varying the molarity between 1 and 3, the rate of the reaction increases significantly. The pH of the reactional medium affects as well the rate of the reaction, since the mechanism of the reaction implies the action of the species $H^+$ in the step of the activated complex. The applicant found that the optimum pH range for the nitrogen gas generating reaction is around 5.0 and, more specifically, between 4.75 and 5.50. The viscosity of the medium affects the rate of the reaction: the higher the viscosity, the longer the life time of the reaction. As far as the calorimetry of the system is concerned, it may be observed that the dissolution of the reagents in water is endothermic, while the generation of nitrogen is strongly exothermic with release to nearly 70–75 Kcal per mol of reagents, such strong exothermicity being extremely advantageous to the formation fracturing process, which occurs without cooling, when in contact with the fluid injected.

DETAILED DESCRIPTION OF THE INVENTION

Figure 1:
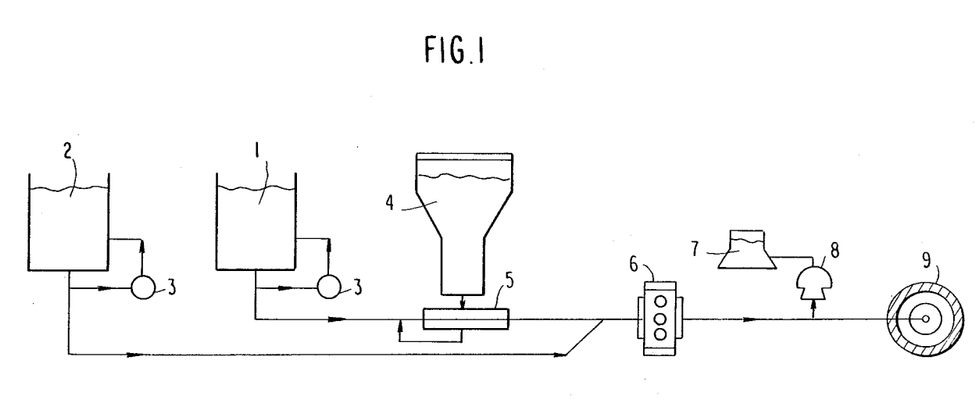
FIG. 1 is a diagram of the hydraulic fracturing process of the present invention.

The flow diagram of the present hydraulic fracturing process with in-situ foam generation is outlined on FIG. I, where: (1) is the tank containing the viscosified solution of ammonium chloride; (2) is the tank containing the solution of sodium nitrite; (3) is the funnel utilized for adding up solids; (4) is the silo for frac sand; (5) is the blender or mixer; (6) is a triplex pump; (7) is the tank containing acetic acid; (8) is a metering pump; and (9) represents the oil well.

With the purpose of obtaining a maximum rate of reaction, and since the maximum solubility of ammonium chloride in water, at ambient temperature (nearly 30° C.), is approximately 32.1% by weight, this provides a solution of molar concentration equal to 6.0, whereas sodium nitrite can reach a molar concentration equal to 9.0 (62.1% by weight) in the same conditions.

Thus, the composition of the solutions of $NH_4Cl$ and $NaNO_2$ must maintain a mass ratio of 1:1.934 for molar concentrations between 6 and 9, respectively, and the mixture of same a volumetric (or flow rate) ratio of 1.5:1 so that equimolar concentrations of the salts may occur, observing thus the stoichiometry of the reaction.

Therefore, the continuous process of hydraulic fracturing with in-situ nitrogen foam generation developed by the applicant with reference to FIG. I is characterized by the following steps:

(a) prepare solutions A and B by dissolving the nitrogen salts $NH_4Cl$ and $NaNO_2$ in the mixing tanks (1) and (2), by means of adding said salts to the mixing water maintained under permanent circulation through the addition funnel (3) of the pumping unit, the concentration of the salts being in the range between 2.0 and 6.0 M (10.7 and 32.1% w/v) for $NaNO_2$, maintaining always the equimolarity of the salts;

(b) prepare the solution C by diluting commercial acetic acid in the acid tank (7) down to the concentration of 40% w/v;

(c) viscosify the solution A by means of adding hydroxyethylcellulose (HEC) to the solution of $NH_4Cl$ in a concentration of 0.3-1.2% w/v;

(d) pump simultaneously the solutions A, B and C in flow rate proportional to the concentrations of each solution in the mixture, first to form a cushion (pre-flash) of foam with quality between 0.50 and 0.98, then with the addition of a propping agent-frac sand (4) in increasing concentrations from zero to 0.92 Kg/liter of solution (7 lb/gal), calculated as a function of the foam volume in the pressure and temperature conditions reached during the operation, and completing the treatment with the cushion of foam (over-flash);

(e) recover the fluids injected, by means of swabbing, if necessary, after the fracture accommodation period and the foam viscosity drop period (for reasons of defoaming and/or breakdown of the viscosifying agent);

(f) put the well in production, performing thus the productivity test.

The present hydraulic fracturing process was tested by means of laboratory methodology for the preparation, characterization and field simulation of nitrogen foam generation.

Thus, details on fracturing fluid preparation, physicochemical and rheological foam characterization, and physical simulation of foam generation are supplied as follows.

As previously described, nitrogen foam originates from the mixture of three aqueous solutions. Table I below describes the composition of these solutions; the concentration of ammonium chloride may be expressed as 6 M, that of sodium nitrite as 9 M, and that of acetic acid as 40% v/v, such concentrations being, as a matter of fact, preferential compositions, existing others, equally susceptible of producing good results in the process of the present invention. As a matter of fact, the concentrations and volumes of the salt solutions must only observe the equimolarity of the reaction.

But, as the concentrations increase (limited to 6 M for $NH_4Cl$ and 9 M for $NaNO_2$), higher is the potentiality of the mixture in $N_2$ generation and consequently larger is the amount of heat and higher is the quality of foam.

TABLE I

| SOLUTION/COMPONENT | CONCENTRATION /1000 ml | /1000 gal |
|---|---|---|
| A Water | 755 ml | 755 gal |
| Ammonium Chloride | 321 g | 2,676 lb |
| Hydroxyethylcellulose | 12 g | 100 lb |
| B Water | 750 ml | 750 gal |
| Sodium Nitrite | 621 g | 5,177 lb |
| C Water | 600 ml | 600 gal |
| Acetic Acid | 400 ml | 400 gal |

The mixture of solutions A, B and C in volumetric amounts proportional to the stoichiometric ratio of the inorganic salts in the chemical reaction for nitrogen generation constitutes the foaming fluid, according to scheme I and Table II, below, said Table summarizing the composition of the fluid, expressed in units per mililiter and per gallon.

SCHEME I $$NH_4Cl + NaNO_2 + H^+ \rightarrow N_2 + NaCl + 2H_2O$$

TABLE II

| SOLUTION | VOLUME /1000 ml | /1000 gal |
|---|---|---|
| A | 600 ml | 600 gal |
| B | 400 ml | 400 gal |
| C | 40 ml | 40 gal |

With the purpose of generating the foam, the mixture of solutions A, B and C is transferred to a graduated cylinder with capacity for 2,000 ml which is immersed in a thermostatic bath at test temperature (60° C.).

An important parameter for laboratory tests is the calculation of the foam generation reaction yield.

The theoretical yield (considering 100% of the reaction) of foam generation was calculated as a function of the effective molar concentration of the salts in the mixture, the volume of the mixture and the volume of nitrogen gas generated per volume of mixture:

$$V_{foam} = V_{mixt} + C_{NH_4Cl\ or\ NaNO_2} \times V_{mixt} \times V_{N_2}$$

With the purpose of characterizing foam generation from a physicochemical and rheological point of view, various parameters, described as follows, were studied:

Reaction Kinetics

The rate of the foam generation reaction was determined from the evolution of foam volume during the test subjecting 100 ml of mixture to a temperature of 60° C. The values of reaction rate were expressed in terms of the percentage of volume relative to the theoretical value stoichiometrically calculated.

Table III below summarizes the kinetic data of the foam generation reaction.

TABLE III

| TIME (min) | FOAM VOLUME (l) | FOAM QUALITY (Γ) | REACTION YIELD (V %) |
|---|---|---|---|
| 0 | 0.1 | 0 | 0 |
| 1/4 | 1.2 | 0.916 | 14.7 |
| 1/2 | 2.4 | 0.958 | 29.4 |
| 3/4 | 2.8 | 0.964 | 34.3 |
| 1 | 3.2 | 0.968 | 39.2 |
| 2 | 3.8 | 0.973 | 46.5 |
| 3 | 4.3 | 0.976 | 51.4 |
| 4 | 4.6 | 0.978 | 56.3 |
| 5 | 5.0 | 0.980 | 61.2 |

It should be pointed out that the theoretical calculation for the 100% yield assumes a foam volume equal to 8.16 liters per 100 ml of mixture and a foam quality equal to 0.988 at atmospheric pressure.

Foam Quality

The calculation of foam quality (Γ) at atmospheric pressure and at the temperature of 60° C. was performed based on values of foaming liquid volume ($V_l$) and foam volume ($V_e$) measured after test completion:

$$\Gamma = \frac{V_g}{V_g + V_l}$$

where: $V_g = V_e - V_l$ then: $\Gamma = \frac{V_e - V_l}{V_e}$

The physicochemical properties of the foam-generating solutions were measured as well, such as density, viscosity, Behavior Index and pH.

Foam Density

The determination of foam density at atmospheric pressure and ambient temperature was performed in a density scale and compared to the value calculated theoretically from the data of liquid density and foam quality:

$$D_e = D_l \times (1 - \Gamma)$$

The values of these properties are shown in the Tables below, where Table IV records these values for the solutions and their mixtures, and Table V records these values for the foam formed.

TABLE IV

|  | A | B | C | MIXTURE |
|---|---|---|---|---|
| Density (g/cm³) | 1.0836 | 1.3489 | 1.0448 | 1.1897 |
| Viscosity[a] (cP) | 810 | 1.0 | 1.0 | 148 |
| Behavior Index (-) | 0.61 | 1.0 | 1.0 | 0.84 |
| pH | 4.45 | 9.16 | 1.74 | 4.73 |

[a] FANN-35A Viscometer 12 rpm and 25° C.

TABLE V

| PROPERTY | VALUE |
|---|---|
| Quality | 0.98 |
| Density (g/l) | 25.02 |
| pH | 5.06 |

The rheological properties of the foam were measured as well. These properties are listed on Table VI below, determined at atmospheric pressure and 60° C., in a Brookfield rotating viscometer, model LVTD, coupled to a vertical path elevator with spindle helipath A-1.

TABLE VI

| PROPERTY |  | READING |
|---|---|---|
| Apparent viscosity (cP): | 12 rpm | 1,450 |
|  | 6 rpm | 2,450 |
|  | 3 rpm | 4,240 |
|  | 1.5 rpm | 7,240 |
|  | 0.6 rpm | 14,510 |
|  | 0.3 rpm | 24,460 |
| Behavior index (-) |  | 0.23 |

As far as the solids carrying ability by the foam is concerned, it was determined from the settling rate of 1.68 mm (10 mesh) sand in static condition and at the temperature of 60° C. The data related to the settling rate are tabulated below (Table VIII).

TABLE VII

| SAND | | SETTLING RATE | |
|---|---|---|---|
| mm | (mesh) | cm/min | ft/min |
| 2.38 | (8) | 0.0666 | 0.00218 |
| 1.41 | (12) | 0.0555 | 0.00182 |
| 0.84 | (20) | 0.0434 | 0.00142 |

The carrying ability of foam may be also expressed as 0.92 Kg of 1.68 mm–0.84 mm (10–20 mesh) sand per liter of foaming mixture (or up to 7 lb/gal).

Another important parameter in the evaluation of foam generated in the control of fluid loss. This measurement was achieved in a filterpress, at the pressure of 7 Kg/cm² (100 psi) and ambient temperature. The filtering element utilized was Whatman filter paper no. 50. During the test, the variation in the volumes of liquid filtrated and foam remanescent in the cell was observed. Table VIII below lists the results relating to this parameter.

TABLE VIII

| PROPERTY | FLUID | |
|---|---|---|
|  | FOAM | LIQUID |
| Q 7½ (cm³) | 146 | 2.9 |
| Q 30 (cm³) | 292 | 5.8 |
| m (cm³/min^{½}) | — | 1.06 |
| $c_w$ (cm₃/min^{½}) | — | 0.0384 | where:

Q 7½ is the volume of liquid or foam filtrated in 7.5 min

Q 30 is the volume of liquid or foam filtrated in 30 min m is the ratio between Δv and Δt^{½} where:

v = volume (cm³)

t = time (min)

$c_w$ is the fluid loss coefficient.

Thermal stability is another important foam characteristic. It has been evaluated at atmospheric pressure and 60° as a function of the change in the volume of foam with time. In this stability test were determined also the foam breakdown time, the viscosity reduction in the liquid phase, the insoluble residue amount, the concentration of sodium chloride, the density and pH of the liquid phase.

In the conditions of atmospheric pressure (adverse condition) and temperature of 60° C., the foam possesses a certain stability, represented by its resistance to defoaming, which is adequate for its utilization in hydraulic fracturing, with the reduction of 50% of the volume of foam in one hour. The liquid phase reaches a final viscosity value equal to 1.5 cP in three hours, when subjected to the temperature of 60° C., presenting only traces of insoluble residues and density of 1.163 g/cm$^3$, due to the presence of sodium chloride—a by-product of the chemical reaction—in a concentration equal to 210 g/l.

The data on thermal stability and foam breakdown are listed respectively on Tables IX and X below, the latter containing properties of foam after breakdown, such as half-life time, final viscosity, residue amount, NaCl concentration, density and pH.

TABLE IX

| TIME (min) | STABILITY (% vol) |
|---|---|
| 0 | 100 |
| 30 | 70 |
| 60 | 53 |
| 90 | 38 |
| 180 | 19 |
| 270 | 9 |

TABLE X

| PROPERTY | VALUE |
|---|---|
| Half-life (min) | 65 |
| Final viscosity (cP) | 1,5 |
| Residue amount | traces |
| NaCl concentration (g/l) | 210 |
| Density (g/ml) | 1.163 |
| pH (-) | 5.80 |

One major characteristic of frac foam is its compressibility. The compressibility of frac foam at a given pressure and temperature condition was calculated from the compressibility factor of nitrogen gas, assuming the incompressibility of the liquid phase, the insolubility of gas in the liquid and the yield of the reaction as being equal to 100%. These data are listed on Table XI as follows.

TABLE XI

| PRESSURE | | TEMPERATURE | | COMPRESSIBILITY FACTOR | FOAM QUALITY |
|---|---|---|---|---|---|
| psi | (Kg/cm$^2$) | °F. | (°C.) | (f) | (Γ) |
| 14.7 | (1.03) | 100 | (37.7) | 0.96 | 0.988 |
| | | 140 | (60.0) | 0.90 | 0.988 |
| | | 180 | (82.2) | 0.84 | 0.989 |
| | | 220 | (104.4) | 0.79 | 0.990 |
| 500 | (35.1) | 100 | (37.7) | 31.66 | 0.718 |
| | | 140 | (60.0) | 29.35 | 0.733 |
| | | 180 | (82.2) | 27.57 | 0.745 |
| | | 220 | (104.4) | 25.79 | 0.756 |
| 1000 | (70.3) | 100 | (37.7) | 63.15 | 0.561 |
| | | 140 | (60.0) | 58.35 | 0.580 |
| | | 180 | (82.2) | 54.43 | 0.597 |
| | | 220 | (104.4) | 48.92 | 0.622 |
| 1500 | (105.4) | 100 | (37.7) | 93.75 | 0.462 |
| | | 140 | (60.0) | 86.63 | 0.482 |
| | | 180 | (82.2) | 80.59 | 0.500 |
| | | 220 | (104.4) | 74.36 | 0.520 |
| 2000 | (140.6) | 100 | (37.7) | 123.46 | 0.395 |
| | | 140 | (60.0) | 113.85 | 0.414 |
| | | 180 | (82.2) | 105.85 | 0.432 |
| | | 220 | (104.4) | 98.20 | 0.451 |

EXAMPLE

Figure 2:
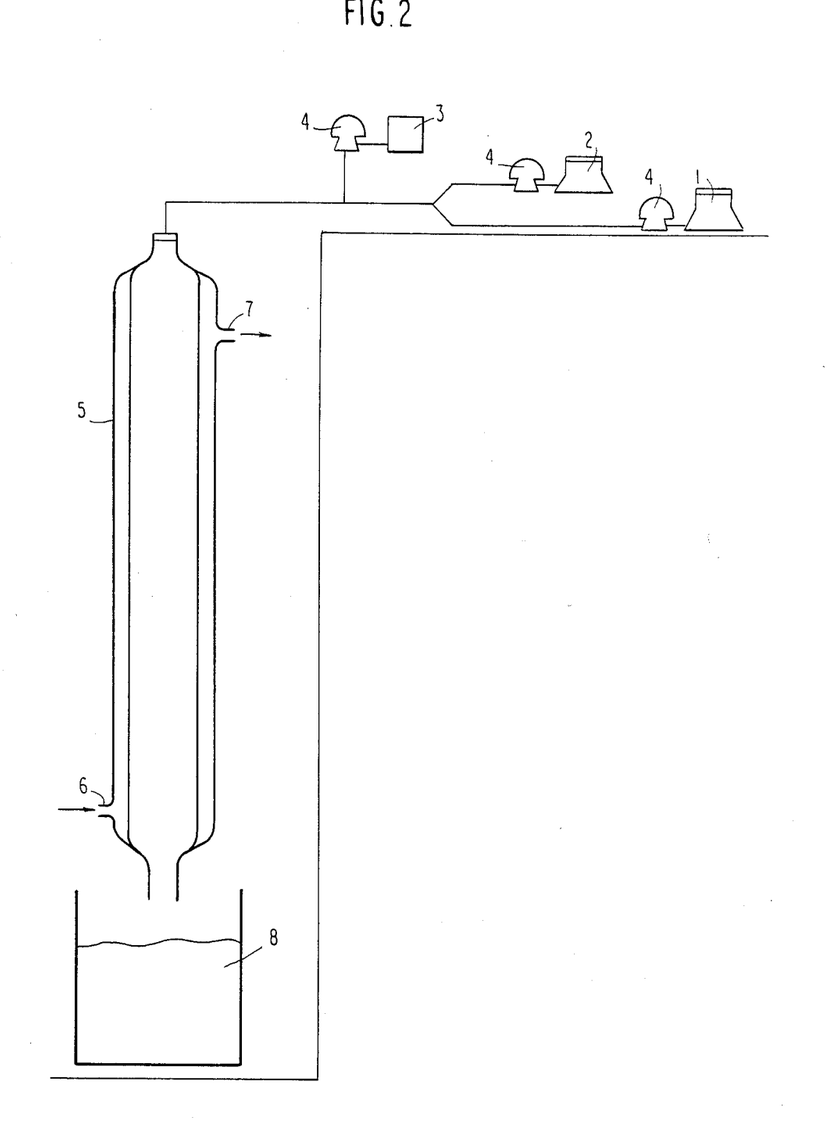
FIG. 2 is a diagram of the experimental apparatus used to simulate the hydraulic fracturing process of the present invention.

The adequacy of the continuous process of hydraulic fracturing with in-situ nitrogen foam generation was tested by means of physical simulation in the laboratory, the process being shown on FIG. II, where the flasks (1) and (2) contain, respectively, the solution of NH$_4$Cl, thickened with HEC, and that of NaNO$_2$, in the appropriate concentrations, flask (3) contains the solution of acetic acid, (4) represents varistaltic pumps, (5) is a sheathed glass tube, (6) is the heating water inlet, (7) is the heating water outlet, and (8) is the foam-collecting recipient.

The composition of the saline solutions utilized is detailed on Table XII below.

TABLE XII

| SOLUTION | CONCENTRATION (mol/l), /%/ | VOLUME (ml) | FLOW RATE (ml/min) |
|---|---|---|---|
| NH$_4$Cl[a] | 6 | 150 | 15 |
| NaNO$_2$ | 9 | 100 | 10 |
| AcOH | /10/ | 5 | 0.5 |

[a]Viscosified with 100 lb/1,000 gal of HEC - QP-100 M-H.

The simulation test performed in the apparatus of FIG. II produced foam with the characteristics listed on Table XIII.

TABLE XIII

| CHARACTERISTIC | VALUE |
|---|---|
| Inlet flow rate (mixture) | 25.5 ml/min |
| Outlet flow rate (foam) | 1,840 ml/min |
| Inlet temperature (mixture) | 30° C. |
| Outlet temperature (foam) | 92° C. |
| Quality | 0.986 |
| Density | 25.0 g/l |
| pH | 5.03 |
| Volume | 18.4 l |
| Yield | 90% |

These data make it possible to verify that the physical simulation of foam generation by a continuous process shows that the adaptation of the process to a field scale for utilization in the hydraulic fracturing of the producing formation is perfectly feasible, limiting the pumping pressure at the wellhead, initially, to values below 140 Kg/cm$^2$ (2,000 psi).

Thus, both the preparation of reagent and catalyst solutions and the mixing of same may be conducted with conventional field resources, that is, pumps, tanks and mixers, and in a relatively short time.

One of the characteristics of the NH$_4$Cl solution is its high viscosity (810 cP), due to the addition of hydroxyethylcellulose. After the mixing with the NaNO$_2$ solution this figure is reduced to 148 cP. The other physicochemical properties of the mixture reach intermediate figures relative to those of the saline solutions, and the pH of 4.73 shall define the rate of the reaction at a given temperature.

The curve of the nitrogen-generation reaction rate under test conditions is characterized by the fast induction in the first two minutes with the generation of 46.5% of the $N_2$ volume, followed by a period of slower foaming, the yield reaching only 61.2% in the following three minutes. This is due to the fact that the reaction rate is directly proportional to the concentrations of $NH_4^+$ and $NO_2^-$ ions consumed during the generation of $N_2$.

The quality of the foam generated by this process reaches a value of 0.98 under atmospheric conditions, which corresponds to a 99% yield.

Figure 3:
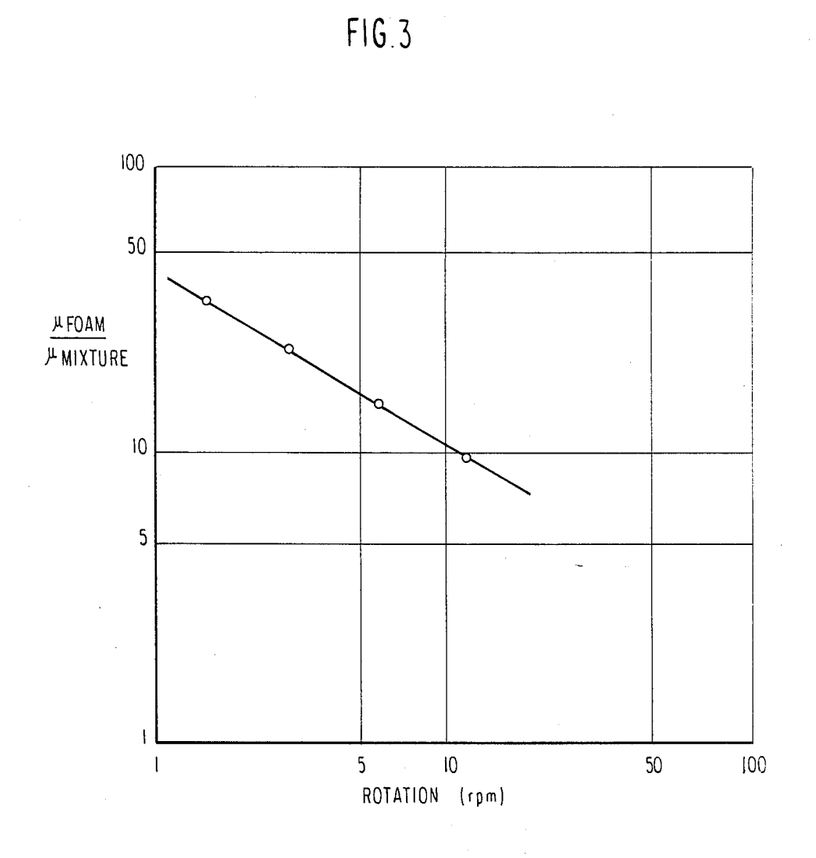
FIG. 3 is a graph relating to the viscosity characteristics of the foam of the present invention.

The rheological properties of the foam are significantly better than those of the generating mixture. The pseudoplasticity of the foam ($n'=0.23$) is higher than that of the mixture ($n'=0.84$), and the ratio between the values of apparent viscosity of the former ($\mu_e$) and of the latter ($\mu_m$) increases exponentially with the reduction in shear rate. This fact is shown on FIG. III.

The present process provides benefits already expected: higher speed and efficiency in the recovery of the fluid injected, without the utilization, after fracturing, of the systems of liquid $N_2$ or swabbing, and lower volume of liquid utilized, reducing thus the formation of emulsions with the oil of the reservoir.

In addition, there is the advantage of the increased temperature of the injected fluid, promoted by the exothermicity of the nitrogen-generation reaction. It is assumed that the increased temperature is advantageous to wells containing paraffinic oil and that the foam reaches quality levels higher than those expected at formation temperature.

During the solution pumping operation, it becomes necessary to have a perfect control of the flow rates, particularly in relation to the acetic acid metering pump. Previous tests may be conducted for best adjusting the rate of the nitrogen generation reaction as a function of the concentration of acetic acid. The propping agent shall be incorporated to the foam-generating mixture in the blender, at a concentration calculated for the volume of foam in bottom-hole condition.

After completing the operation, well opening for cleanout purposes shall be slow and gradual, to avoid removing the propping agent near the well, until the fracture is fully closed.

The curve of foam stability, determined at the temperature of 60° C. and at atmospheric pressure, indicates that its half-life time is 65 minutes.

It is anticipated that the pressure reduction of the foam during its recovery shall promote a significant expansion thereof at the surface. Depending upon the quality and the volume of the foam recovered, the technique of defoaming by means of an ethyl alcohol shower may be utilized, thus reducing considerably the volume of fluid.

Thus, the present invention provides a process of hydraulic fracturing with in-situ nitrogen foam generation, said process making possible a significant penetration on the part of the fracturing fluid, with low fluid loss and consequently with a nearly null settling of the fluid and low formation damage. The quality of the foam formed is high, that is, the ratio between the volume of gas and the volume of gas plus liquids in the fluid is high. The fact of the settling rate of the propping agent (sand) being close to zero makes it possible to avoid separation by settling between the propping agent and the fluid. In addition, the high gas content in foams produced by the present invention makes it possible to remove most of the liquid from the formation after having completed the fracturing treatment.

We claim:

1. A continuous process of hydraulic fracturing of a well with in situ nitrogen foam generation, comprising the steps of:
    (a) preparing an aqueous solution of $NH_4Cl$ having a concentration of from 2.0–6.0 M;
    (b) preparing an aqueous solution of $NaNO_2$ having a concentration of from 6.0–9.0 M;
    (c) preparing an aqueous solution of acetic acid having a concentration of about 40% v/v;
    (d) adding hydroxyethylcellulose (HEC) to said $NH_4Cl$ solution at a concentration of from 0.3–1.2% w/v to form a viscosified $NH_4Cl$ solution;
    (e) simultaneously pumping said viscosified $NH_4Cl$ solution and said $NaNO_2$ solution to form a mixture having equimolar amounts of $NH_4Cl$ and $NaNO_2$ thereby initiating an equimolar reaction between the components of said mixture;
    (f) pumping the acetic acid solution into the equimolar mixture of $NH_4Cl$ solution and $NaNO_2$ solution, so as to initiate foam generation, while keeping the pH of the mixture between 4.75 and 5.50;
    (g) injecting a cushion of the generated foam into the well (pre-flash);
    (h) initiating the fracturing of the formation by injecting foam to which is added sand as a propping agent, said agent being added to the viscosified $NH_4Cl$ solution, in amounts varying from zero to 0.92 kg/l of the foaming mixture; and
    (i) after the fracturing, injecting in the well a cushion of sand-free foam (over-flash) of the same composition as the fracturing foam.

2. A process according to claim 1, wherein the volume of said foam reaches about 5.0 liters for each 100 ml of said mixture employed about 5 minutes after said reaction is initiated having a yield of about 61.2% and a foam quality of about 0.98 wherein the components of said mixture comprise a $NH_4Cl$ solution having a concentration of about 6.0 M and a $NaNO_2$ solution having a concentration of about 9.0 M.

3. A process according to claim 1, wherein the half-life time of said equimolar reaction is about 60 minutes and wherein the ratio between the gas volume and the liquid volume of said foam is about 72/1.

* * * * *

UNITED STATES PATENT AND TRADEMARK OFFICE
CERTIFICATE OF CORRECTION

PATENT NO. : 4,846,277

DATED : July 11, 1989

INVENTOR(S) : Carlos Khalil, et al

It is certified that error appears in the above-identified patent and that said Letters Patent is hereby corrected as shown below:

In the Abstract, at step (g), delete "(pre-flash)" and insert therefor --(pre-flush)--;

at step (i), delete "(over-flash)" and insert therefor --(over-flush)--.

Column 5, line 48, delete "0.3·1.2% w/v" and insert therefor --0.3-1.2% w/v--;

line 58, delete "(over-flash)" and insert therefor --(over-flush)--.

Column 8, line 54, delete "m $(cm^3/min^{178})$" and insert therefor --m$(cm^3/min^{1/2})$--;

line 55, delete "$c_w$ $(cm^3/min^{178})$" and insert therefor --$C_w(cm^3/min^{1/2})$--.

Claim 1, at column 12, line 38, delete "(pre-flash)" and insert therefor --(pre-flush)--;

UNITED STATES PATENT AND TRADEMARK OFFICE
CERTIFICATE OF CORRECTION

PATENT NO. : 4,846,277

DATED : July 11, 1989

INVENTOR(S) : Carlos Khalil, et al

It is certified that error appears in the above-identified patent and that said Letters Patent is hereby corrected as shown below:

Column 12, line 45, delete "(over-flash)" and insert therefor --(over-flush)--.

Signed and Sealed this

Twenty-sixth Day of June, 1990

Attest:

HARRY F. MANBECK, JR.

*Attesting Officer*  *Commissioner of Patents and Trademarks*